US010545714B2

(12) United States Patent
Rochford et al.

(10) Patent No.: US 10,545,714 B2
(45) Date of Patent: Jan. 28, 2020

(54) DUAL SCREEN HEAD MOUNTED DISPLAY

(71) Applicant: Samsung Electronics Co., Ltd., Gyeonggi-do (KR)

(72) Inventors: Ciaran Rochford, Bellevue, WA (US); Philippe Harscoet, Bellevue, WA (US); Sathyanarayanan Nagarajan Iyer, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 445 days.

(21) Appl. No.: 14/846,383

(22) Filed: Sep. 4, 2015

(65) Prior Publication Data

US 2017/0068500 A1 Mar. 9, 2017

(51) Int. Cl.
*G06F 3/14* (2006.01)
*G06F 3/041* (2006.01)

(52) U.S. Cl.
CPC .......... *G06F 3/1431* (2013.01); *G06F 3/0416* (2013.01); *G06F 3/1454* (2013.01)

(58) Field of Classification Search
CPC ...... G06F 3/1431; G06F 3/1454; G06F 3/012; G06F 3/013
See application file for complete search history.

(56) References Cited

U.S. PATENT DOCUMENTS

| 5,991,085 | A  | * | 11/1999 | Rallison | ................ | G02B 27/017 345/8 |
| 6,480,174 | B1 | * | 11/2002 | Kaufmann | ......... | G02B 27/0172 345/7 |
| 8,467,133 | B2 | * | 6/2013 | Miller | .................. | G02B 27/017 353/28 |
| 8,866,699 | B2 |   | 10/2014 | Roth et al. | | |
| 8,908,043 | B2 |   | 12/2014 | Tricoukes et al. | | |
| 9,552,062 | B2 | * | 1/2017 | Gohl | ........................ | G06F 3/013 |
| 9,841,939 | B2 | * | 12/2017 | Liu | ........................ | G06F 3/1454 |
| 2007/0258658 | A1 | * | 11/2007 | Kobayashi | .............. | G06T 15/20 382/276 |
| 2009/0040233 | A1 |   | 2/2009 | Yamamoto | | |
| 2009/0081959 | A1 | * | 3/2009 | Gyorfi | ..................... | H04L 67/18 455/70 |

(Continued)

FOREIGN PATENT DOCUMENTS

| EP | 2896986 A1 | 7/2015 |
| JP | H11-084308 A | 3/1999 |

(Continued)

OTHER PUBLICATIONS

European Patent Office, "Extended European Search Report," Application No. 6183631.7-1562, dated Jan. 27, 2017, 7 pages, publisher EPO, Munich, Germany.

(Continued)

*Primary Examiner* — Antonio Xavier (57) ABSTRACT

An apparatus and method are presented for displaying information on a head mounted display (HMD). The HMD includes an internal display, visible to a user of the HMD, and an external display, visible to a person other than the user. The method includes displaying internal information on the internal display and displaying external information on the external display, where the external information relates to host system information received from the host system or user information relating to the user.

21 Claims, 4 Drawing Sheets

(56) References Cited

U.S. PATENT DOCUMENTS

| | | | | |
|---|---|---|---|---|
| 2009/0243966 A1* | 10/2009 | Kato | G02B 27/017 | 345/8 |
| 2010/0079356 A1* | 4/2010 | Hoellwarth | G02B 27/017 | 345/8 |
| 2012/0182402 A1* | 7/2012 | Hwangbo | G06K 9/00711 | 348/51 |
| 2013/0187835 A1* | 7/2013 | Vaught | G06K 9/00604 | 345/8 |
| 2013/0241955 A1* | 9/2013 | Tamaru | G02B 27/01 | 345/633 |
| 2014/0160129 A1 | 6/2014 | Sako et al. | | |
| 2014/0361976 A1 | 12/2014 | Osman et al. | | |
| 2015/0002373 A1* | 1/2015 | Kobayashi | G02B 27/017 | 345/8 |
| 2015/0009102 A1* | 1/2015 | Abdollahi | G02B 27/0176 | 345/8 |
| 2015/0153831 A1* | 6/2015 | Kim | G02B 27/017 | 345/156 |
| 2015/0219897 A1 | 8/2015 | Mukawa et al. | | |
| 2015/0237402 A1* | 8/2015 | Lee | H04N 21/47202 | 725/46 |
| 2016/0054565 A1* | 2/2016 | Izumihara | G09G 5/00 | 345/8 |
| 2016/0217621 A1* | 7/2016 | Raghoebardajal | G06T 19/006 | |
| 2016/0260408 A1* | 9/2016 | Chen | G06F 3/1446 | |
| 2016/0282618 A1 | 9/2016 | Kon et al. | | |
| 2017/0011706 A1* | 1/2017 | Namkung | G09G 5/006 | |
| 2017/0097509 A1* | 4/2017 | Yoshida | G02B 27/0176 | |
| 2018/0024370 A1* | 1/2018 | Carollo | H04N 13/0285 | |

FOREIGN PATENT DOCUMENTS

| | | |
|---|---|---|
| JP | 2010-211662 A | 9/2010 |
| WO | 2014156389 A1 | 10/2014 |
| WO | 2015092968 A1 | 6/2015 |

OTHER PUBLICATIONS

European Search Report dated Feb. 11, 2019 in connection with European Patent Application No. 18 19 8183, 8 pages.

Supplementary European Search Report dated Feb. 12, 2019 in connection with European Patent Application No. 17 74 7831, 9 pages.

* cited by examiner

DUAL SCREEN HEAD MOUNTED DISPLAY

TECHNICAL FIELD

The present application relates generally to display devices and, more specifically, to a dual screen head mounted display.

BACKGROUND

A head mounted display (HMD) places one or more display screens in front of the eyes of a user, typically to present a pseudo-stereo view of a real or computer generated 3D scene. Except where the HMD is in the form of glasses or goggles through which the user can see "the real world," a HMD typically impedes interaction with the user by a person standing in front of or nearby to the user.

SUMMARY

In a first embodiment, head mounted display (HMD) includes a headpiece to removably couple the HMD to the body of a user. The HMD also includes an internal display that is visible to the user and an external display that is visible to a person other than the user. The HMD further includes a controller that communicates with the internal display, the external display, and a host system. The controller displays internal information on the internal display and external information on the external display. The external information relates to host system information received from the host system or to user information relating to the user.

In a second embodiment, an apparatus includes a processor, in communication with a communication interface. The processor communicates via the communication interface with a HMD that includes an internal display, visible to a user of the HMD, and an external display, visible to a person other than the user. The processor sends a first message to the HMD that causes the HMD to display internal information on the internal display. The processor sends a second message to the HMD that causes the HMD to display external information on the external display. The external information relates to host system information received from the host system or to user information relating to the user. The internal information and the external information are received by the HMD from the apparatus.

In a third embodiment, method displays information on a HMD. The HMD includes an internal display, visible to a user of the HMD, and an external display, visible to a person other than the user. The method includes displaying internal information on the internal display and displaying external information on the external display, where the external information relates to host system information received from the host system or user information relating to the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The present disclosure adds an external display to a head mounted display (HMD) to enable greater interaction by a person other than a user of the HMD with the user. The external display may help identify the user to the person, allow the person to interact with the user, or provide the person with information about the user's use of the HMD.

Figure 1:
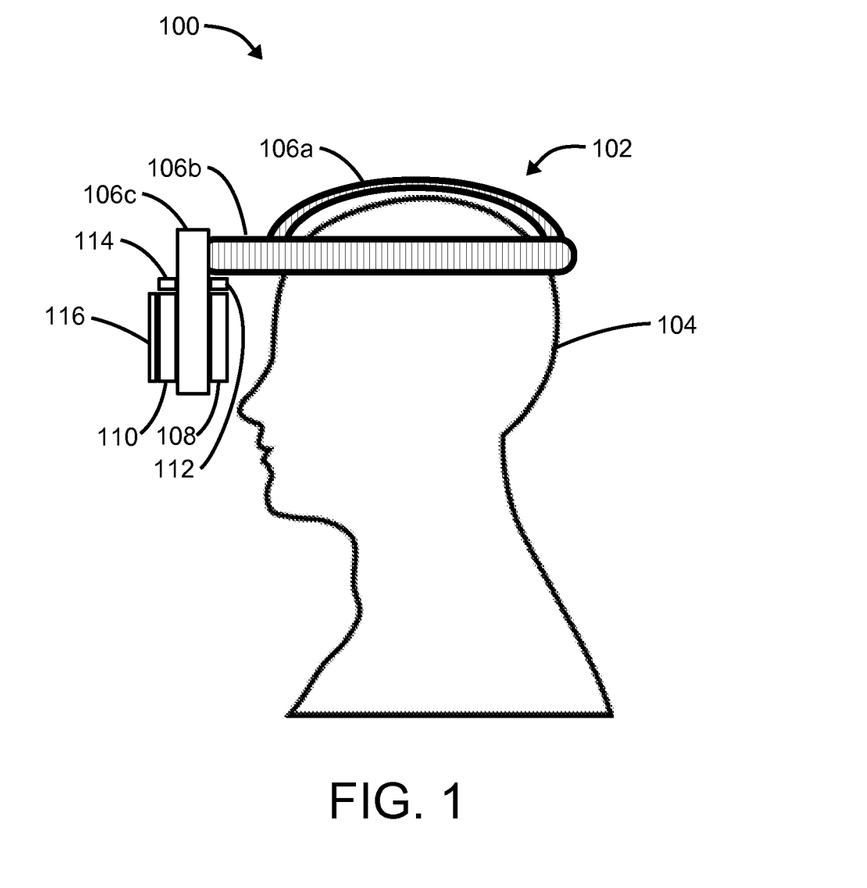
FIG. 1 illustrates a head mounted display according to the disclosure.

FIG. 1 illustrates a head mounted display 100 according to the disclosure. The HMD 100 includes a headpiece 102 that enables a user 104 to wear the HMD 100. The HMD 100 may be removed from the head of the user 104 when not in use. The headpiece 102 includes a band 106b that wraps around the sides and back of the head of the user 104 to maintain display elements of the HMD 100 in front of the face of the user 104. The headpiece 102 also includes a strap 106a that extends from the front to the back of the HMD 100 to support the HMD 100 in a vertical position to maintain at least one display of the HMD 100 in front of the eyes of the user 104.

In other embodiments, the headpiece 102 may be a helmet or other structure suitable for removably coupling the HMD 100 to the head of the user 104 and position display elements of the HMD 100 in front of at least a portion of the face of the user 104.

The headpiece 102 may also include an element 106c for mounting (or mechanically coupling) other elements of the HMD 100 to the headpiece 102. An internal display 108 is mounted to the headpiece 102 in a position the user 104 is able to view the display 108. An internal sensor 112 may be mounted to the headpiece 102 in a position that permits the sensor 112 to acquire information about the user 104.

An external display 110 is mounted to the headpiece 102 in a position where a person (not shown) other than the user 104 may view the display 110. While the display 110 is shown mounted to a front side of the HMD 100, it will be understood that in other embodiments the display 110 may be mounted in any suitable position on the headpiece 102. In still other embodiments, a plurality of external displays 110 may be mounted to the headpiece 102.

An external sensor 114 may be mounted to the headpiece 102 in a position that permits the sensor 112 to acquire information about the person other than the user 104. While the sensor 112 is shown mounted to a front side of the HMD 100, it will be understood that in other embodiments the sensor 112 may be mounted in any suitable position on the headpiece 102. In still other embodiments, a plurality of external sensor 112 may be mounted to the headpiece 102.

A touch sensitive device (TSD) 116 may be mounted to the headpiece 102 in a position that permits the person other than the user 104 to activate or otherwise use the TSD 116. While the TSD 116 is shown mounted to a front side of the external display 110, it will be understood that in other embodiments the TSD 116 may be mounted in any suitable position on the headpiece 102. In still other embodiments, a plurality of TSDs 116 may be mounted to the headpiece 102.

The internal sensor 112 and/or the external sensor 114 may comprise one or more of any suitable sensor technologies. Examples of such suitable technologies include, but are not limited to: proximity sensors, infrared (IR) cameras, red-green-blue (RGB) or other visible light cameras, IR or visible light depth or stereo cameras.

Internal information displayed to the user 104 on the internal display 108 may be 2D images acquired by the external sensor 114. Such sensor images may be combined with computer generated images that may include text and/or graphics. Such combined sensor images and computer generated images may be of the type typically referred to as augmented reality.

Internal information may additionally or alternatively include 3D information produced by presenting side-by-side images such that an image on a left side of the display 108 is visible to the left eye of the user 104 and an image on a right side of the display 108 is visible to the right eye of the user 104. Such 3D internal information may be generated by a 3D camera, by a computer, by combining information from a 3D camera and a computer, or by 3D renderings of a computer model. Such 3D renderings may be generated by a computer-aided design (CAD) program, a game program, a program for visualizing scientific concepts or data, an educational program, a program for visualizing database information, or other such visualization program. Such visualization programs may run on a host system in communication with the HMD 100 (described in greater detail with reference to other Figures) or in the HMD 100, if it provides adequate computing power.

In some embodiments, the internal display 108 and/or the external display 110 is a smart phone, personal digital assistant (PDA), or other suitable standalone wired or wireless device. Such a device may be removably coupled to the headpiece 102, enabling the standalone device to be used for other purposes when not being used as a part of HMD 100. In still other embodiments, both the internal display 108 and the external display 110 are provided by a single such standalone device having two displays and being adapted to fold into a configuration where the two displays are on opposite faces of the device. Again, such a device may be removably coupled to the headpiece 102.

In some embodiments, a system according to the disclosure displays external information on the external display 110 that is a 2D version of the 3D internal information displayed on the internal display 108. Such external information would allow the person other than the user 104 to observe the internal information being viewed by the user 104.

In other embodiments, a system according to the disclosure additionally or alternatively includes predetermined information relating to the user 104 in the external information. Such predetermined information may include the user's name; a portion of the user's image; a cartoon character, a movie clip, or other arbitrary image or video selected by the user; or other such predetermined information. The user 104 may activate controls on the HMD 100 (not shown) or on a host system in communication with the HMD 100 (also not shown in FIG. 1) to select the predetermined information to be included on the external display 110.

In yet other embodiments, a system according to the disclosure additionally or alternatively includes information relating to a status of the user 104 in the external information. Such information may be the word "Busy" or other text or graphic indication that the user 104 is engaged in an activity and would prefer not to be disturbed, or the word "Available" or other text or graphic indication that the user 104 may be interrupted, if needed.

In still other embodiments, a system according to the disclosure includes in the external information a video feed or a static image of the face of the user 104. Such a video feed or static image may be received as internal input information from the internal sensor 112. The system may utilize such external information to indicate that the user 104 is utilizing the HMD 100 in a pass-through or augmented reality mode—i.e., that the user 104 is able to see his/her surrounding physical space.

In further embodiments, a system according to the disclosure additionally or alternatively includes information based on external input information received from the external sensor 114 in the external information. In one such embodiment, a facial recognition algorithm executing in the system is used to identify a person who is within view of the sensor 114. The user 104 may store in the system preferences for information to be included in the external information when particular persons are identified based on such external input information. The inclusion of such information in the external information may be enabled and disabled by the user.

Examples of information to be displayed based upon such recognition of a person include, but are not limited to, text conveying a question to the person, such as, "Do you want to talk?" The person may make a predefined gesture in response to the displayed question, the gesture may be sensed by the external sensor 114, and recognized by the system according to the disclosure. Further information included in the external display 110 and/or the internal display 108 may be based on the recognition of the gesture.

If the gesture is recognized as signaling that immediate communication with the user 104 is not desired, the system may include no such further information, or may only indicate that the recognized person was detected. Where the gesture is recognized as signaling that immediate communication with the user 104 is desired, the system may replace with or include in the external information further text such as, "Just a minute while I finish something." Or, the system may include in the internal display 108 text such as, "[Recognized person's name] wants to speak with you." In another example, the internal display 108 may cease displaying previous internal information and enter pass-through mode, i.e., begin displaying internal information comprising a view captured by the external sensor 114. It will be understood that in other embodiments, other responses may be made to the recognition of a person and/or a gesture by a system according to the disclosure.

In still other embodiments, a system according to the disclosure selects information to be displayed on the external display 110 or to be included in the external information based upon recognition of an environment in which the user 104 is using the HMD 100. Such selection of information may be based upon preferences stored by the user in the system. For example, information to be included or displayed may be selected based upon whether the user 104 is at home or in his/her office. In another example, such information may be selected based upon whether the user 104 is in a public place (such as a train) or in a more private place (such as the home or the office).

In some embodiments, a system according to the disclosure analyzes external input information received from the external sensor 114 to recognize whether a person who is within view of the sensor 114 is using an external device that the system may communicate with. Examples of such an external device include, but are not limited to, a HMD, some other type of portable device, or a fixed external device, such as a flat screen display or a digital projector. If the system detects such an external device, the system attempts to establish communication with the person's HMD or external device via Bluetooth, Infrared Data Association, or other suitable short distance communication protocol.

In other embodiments, a system according to the disclosure recognizes the presence of an external device via receipt of one or more wired or wireless messages announcing the presence of the external device. In such embodiments, the system may interact with the user 104 using internal information on the internals display 108 to obtain from the user 104 selections of options and/or instructions on how to proceed.

As part of establishing such communication, or in response to successfully establishing such communication, the system of such embodiments may send information in a message to the external device. Such sent information may relate to one or more of the external input information received from the external sensor 114, the external information being displayed on the external display 110, or the internal information being displayed on the internal display 108.

Additionally or alternatively, the system may receive information in a message from the external device. Such received information may cause the system to include information related to one or more of the external input information received from the external sensor 114 or the internal information being displayed on the internal display 108, or may cause some other change in the external information or the internal information.

In still other embodiments, where the HMD 100 includes a touch sensitive device (TSD) 116, a system according to the disclosure receives touch input information from the TSD 116 and interprets the touch input information as an indication by the person other than the user 104 as a suggestion of a direction to turn. Where the external information presents a version of the internal information being viewed by the user 104, the touch input information may be interpreted as identifying a portion of the displayed information to examine more closely. In either case, the system modifies the internal information accordingly, or includes information relating to or derived from the touch input information in the internal information.

In some embodiments, a system according to the disclosure displays on the external display an arrow or other graphical indicator of a direction the user 104 may turn or walk, based upon information received from the visualization program producing the internal information being viewed by the user 104. Display of such an indicator may be based upon information received from a visualization program indicating, for example, that the only path available to a game player requires turning in a particular direction to proceed. Or, where the user 104 is utilizing the HMD 100 in an augmented reality mode, the system determines that the path being followed will likely involve turning in a particular direction.

Figure 2:
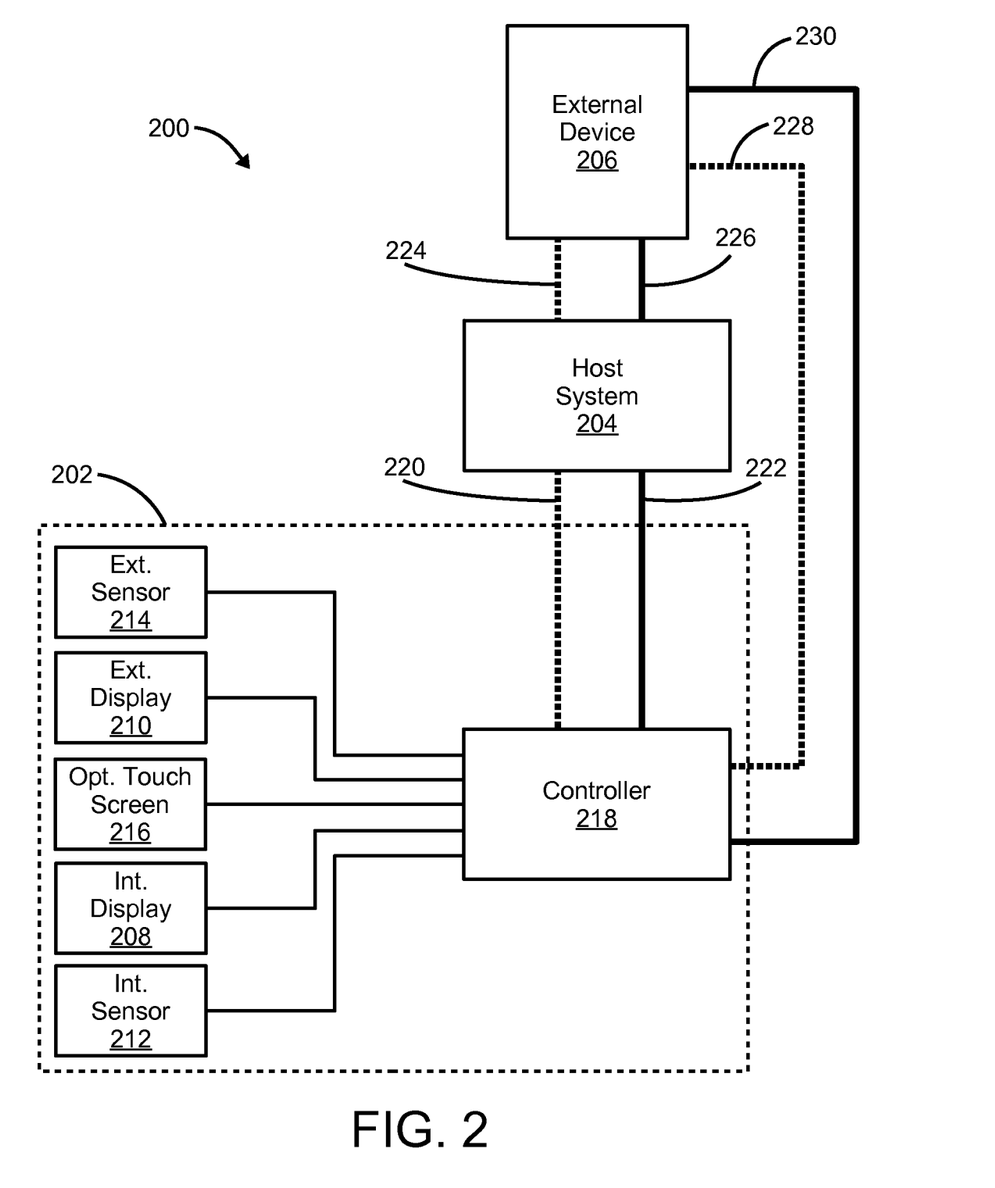
FIG. 2 illustrates a system for use of a head mounted display according to the disclosure.

FIG. 2 illustrates a system 200 for use of a HMD 202 according to the disclosure. The HMD 202 includes a controller 218, which will be described in more detail with reference to FIG. 3. The controller 218 is communicatively coupled to HMD elements internal display 208, external display 210, optional internal sensor 212, optional external sensor 214, and optional touch sensitive device 216. While the HMD elements are shown coupled to the controller 218 by separate links in FIG. 2, it will be understood that in other embodiments, some or all of the HMD elements may be coupled to the controller 218 by a bus system or other suitable communication link. Where one or both of the internal display 208 and the external display 210 is a smart phone or other standalone wireless device, controller 218 may communicate with such devices via a wired interface, such as an Ethernet or USB, or via a wireless interface, such as IR, Bluetooth, WiFi, or other suitable technology.

In some embodiments, the controller 218 has sufficient processing power to execute a visualization program and provide all functionality of a system according to the disclosure, as described herein. In such embodiments, the controller 218 may be communicatively coupled to an external device 206. Communication between the controller 218 and the external device 206 may via one or both of a wireless communication link 228 and/or a wired communication link 230. The wired link 230 may utilize Ethernet, USB, or other suitable network or point-to-point wired communication technology. The wireless link 228 may include, but is not limited to, WiFi and cellular communications. Where one or both of the internal display 208 and/or the external display 210 are provided by a smart phone or other standalone wireless device, the controller 218 may utilize the wireless communication capability of the standalone wireless device to establish wireless link 228.

In other embodiments, the controller 218 does not have sufficient processing power to execute a visualization program and provide all functionality of a system according to the disclosure. In such embodiments, the controller 218 is communicatively coupled to a host system 204 via one or both of a wireless communication link 220 and/or a wired communication link 222. The host system 204 is further communicatively coupled to the external device 206 via one or both of a wireless communication link 224 and/or a wired communication link 226. In such embodiments, the host system 204 executes the visualization program and the functionality of the system according to the disclosure. The system functionality may be provided by the visualization program, or may be provided by a driver or other standalone application.

In still other embodiments, the controller 218 may provide some functions of a system according to the disclosure, while the host system 204 provides other functions. For example, the host system 204 may execute the visualization program, while the controller 218 provides other functions of the system. In still other embodiments, some functions of the system may be provided by a third processing platform (not shown) that is communicatively coupled to one or both of the controller 218 and the host system 204. For example, the host system 204 may execute the visualization program, while the third platform provides other functions of the system.

Figure 3:
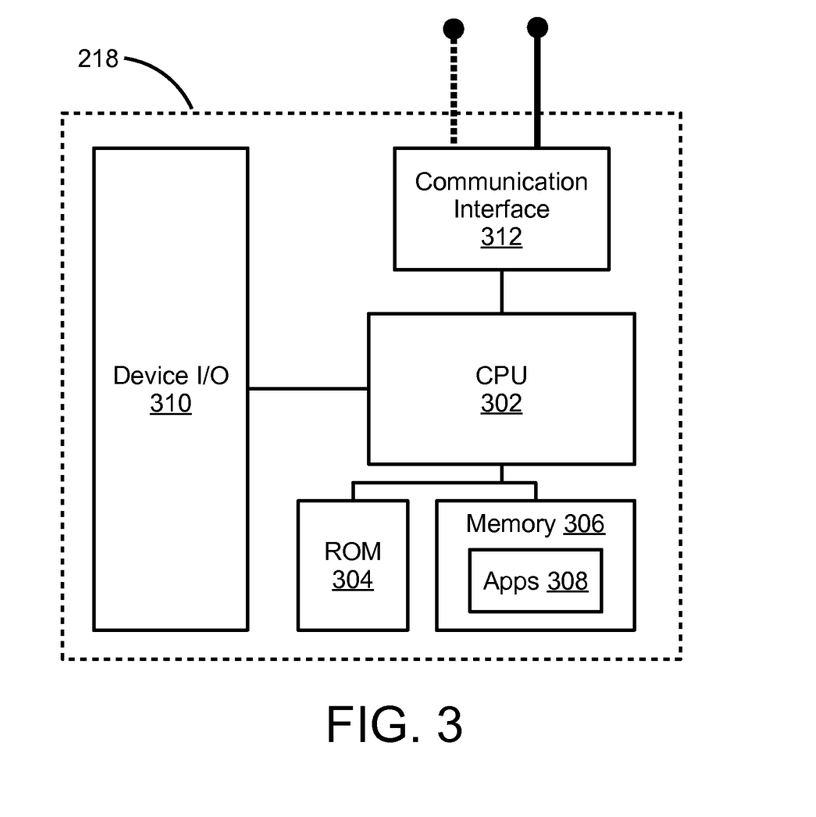
FIG. 3 illustrates a controller for a head mounted display according to the disclosure.

FIG. 3 illustrates a controller 218 for a head mounted display according to the disclosure. The controller 218 includes read-only memory (ROM) 304, random access memory (RAM) 306, central processing unit (CPU) 302, device input/output (I/O) circuitry 310, and communication interface 312. In one embodiment, ROM 304 may store a boot-routine and other static data and RAM 306 may store an operating system (not shown) and applications 308. In an advantageous embodiment, ROM 304 and RAM 306 may comprise a single electronically erasable memory, such as a Flash memory, that is used in conjunction with a conventional RAM memory that is used to store dynamic data. A person of skill in the art will recognize that the controller 218 may include numerous other elements in addition to those shown in FIG. 3.

CPU 302 is responsible for the overall operation of the controller 218. In an exemplary embodiment, CPU 302 executes applications 308. According to the principles of the disclosure, applications 308 provide some or all functionality of a system according to the disclosure, as described herein, and may include a visualization program.

CPU 302 communicates with HMD elements internal display 208, external display 210, optional internal sensor 212, optional external sensor 214, and optional touch sensitive device 216 via device I/O circuitry 310. The CPU 302 communicates with one or both of host system 204 and external device 206 via communication interface 312.

Figure 4:
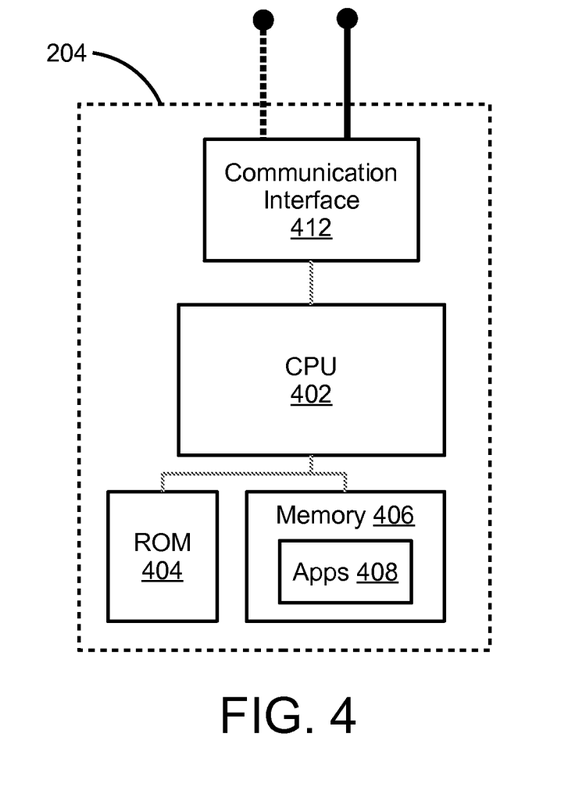
FIG. 4 illustrates a host system for a head mounted display according to the disclosure.

FIG. 4 illustrates a host system 204 for a head mounted display according to the disclosure. The host system 204 includes read-only memory (ROM) 404, random access memory (RAM) 406, central processing unit (CPU) 402, and communication interface 412. In one embodiment, ROM 404 may store a boot-routine and other static data and RAM 406 may store an operating system (not shown) and applications 408. A person of skill in the art will recognize that the host system 204 may include numerous other elements in addition to those shown in FIG. 4.

CPU 402 may responsible for the overall operation of the host system 204. In an exemplary embodiment, CPU 402 executes applications 408. According to the principles of the disclosure, applications 408 provide some or all functionality of a system according to the disclosure, as described herein, and may include a visualization program. CPU 402 communicates with one or both of HMD 202 and external device 206 via communication interface 412.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A head mounted display (HMD), comprising:
a headpiece configured to removably couple the HMD to a body of a user of the HMD;
an external sensor;
an internal display coupled to the headpiece and visible to the user, wherein the internal display is configured to present separate side-by-side images;
an external display coupled to the headpiece and visible to a person other than the user; and
a controller coupled to the internal display and the external display,
wherein the controller is configured to:
recognize an environment of the user, the environment including a public place or a private place;
select information based upon the recognized environment of the user;
display internal information on the internal display and external information on the external display, wherein the external information includes:
responsive to recognition of another person or a gesture, an image of a portion of a face of the user covered by the HMD, and
the selected information based upon the recognized environment of the user;
wherein at least one of the internal display and the external display is removably coupled to the headpiece, and
wherein the internal information comprises a three-dimensional (3D) information and the external information includes a two-dimensional (2D) version of the internal information.

2. The head mounted display of claim 1, wherein the controller is further configured to include predetermined user information, selected by the user, in the external information.

3. The head mounted display of claim 1, further comprising:
an external sensor device coupled to the controller,
wherein the controller is further configured to include information based upon external input information received from the external sensor in at least one of the internal information and the external information.

4. The head mounted display of claim 1,
wherein the external display comprises a plurality of display screens.

5. The head mounted display of claim 1, further comprising:
an external sensor device coupled to the controller,
wherein:
the controller is further configured to:
send a first message to an external device, in response to external input information received from an external sensor, and
modify one of the external information and the internal information, in response to a second message received from the external device.

6. The head mounted display of claim 1, further comprising:
an internal sensor device coupled to the controller,
wherein the controller is further configured to include information based upon internal input information received from the internal sensor in the external information.

7. The head mounted display of claim 1, further comprising:
a touch sensitive device coupled to the controller,
wherein the controller is further configured to include information based upon touch input information detected by the touch sensitive device in one or both of the internal information and the external information.

8. The head mounted display of claim 1, wherein:
the external sensor is configured to take an image of the environment of the user;
external information further includes a portion of an image captured by the external sensor; and
wherein the internal information comprises user information corresponding to the user.

9. A non-transitory computer readable medium comprising a plurality of instructions that when executed by a processor are configured to cause the processor to:
display, via an internal display coupled to the processor via a communication interface, internal information, wherein the internal display is coupled to a headpiece of a head mounted display (HMD) system and is disposed to be visible to a user wearing the HMD, wherein the internal display comprises a single screen configured to present separate side-by-side images to the user; and display, via an external display coupled to the processor via the communication interface, external information, wherein external information includes:

responsive to recognition of another person or a gesture, an image of a portion of a face of the user covered by the HMD, and, information selected by the processor based upon recognition of an environment of the user by an external sensor;

wherein the external display is coupled to the headpiece of the head mounted display (HMD) system and is disposed to be visible to a person other than the user, wherein the internal information comprises a three-dimensional (3D) information and the external information includes a two-dimensional (2D) version of the internal information; and wherein at least one of the internal display and the external display is removably coupled to the HMD.

10. The non-transitory computer readable medium of claim 9, wherein the plurality of instructions is further configured to cause the processor to include predetermined user information, selected by the user, in the external information.

11. The non-transitory computer readable medium of claim 9, wherein the plurality of instructions is further configured to cause the processor to include information, based upon external input information detected by an external sensor, in at least one of the internal information and the external information.

12. The non-transitory computer readable medium of claim 9, wherein the external display comprises a plurality of display screens and where the plurality of instructions is further configured to cause the processor to display the external information on one or more of the plurality of display screens.

13. The non-transitory computer readable medium of claim 12, wherein the plurality of instructions is further configured to cause the processor to:

send a first message to an external device, in response to external input information received from an external sensor, and modify one of the external information and the internal information, in response to a second message received from the external device.

14. The non-transitory computer readable medium of claim 9, wherein the plurality of instructions is further configured to cause the processor to include information based upon internal input information received by the processor from an internal sensor in the external information.

15. The non-transitory computer readable medium of claim 9, wherein the plurality of instructions is further configured to cause the processor to include information based upon touch input information detected by a touch sensitive device in one or both of the internal information and the external information.

16. A method comprising:

displaying internal information on an internal display removably coupled to a head mounted display (HMD), the internal display disposed to be visible to a user wearing the HMD; and displaying external information on an external display removably coupled to the HMD, the external display disposed to be visible to a person other than the user, the external information including: responsive to recognition of another person or a gesture, an image of a portion of a face of the user covered by the HMD, and information selected based upon recognition of an environment by an external sensor;

wherein the internal information comprises a three-dimensional (3D) information and the external information includes a two-dimensional (2D) version of the internal information.

17. The method of claim 16, further comprising:
including predetermined user information, selected by the user, in the external information.

18. The method of claim 16, the method further comprising:

receiving external input information from an external sensor; and including information based upon the external input information received from the external sensor in one of the internal information and the external information.

19. The method of claim 16, the method further comprising:

in response to external input information received from an external sensor, sending a first message to an external device; and in response to a second message received from the external device, modifying one of the external information and the internal information.

20. The method of claim 16, the method further comprising:

including information, in the external information, based upon internal input information received from an internal sensor.

21. The method of claim 16, the method further comprising:

including information, based upon touch input information detected by a touch sensitive device, in one or both of the internal information and the external information.

* * * * *